INVENTORS
MASAHIRO AMEMIYA, SHIUZI SAKUMA,
SUSUMU KUROKAWA, MASAYUKI EMOTO

BY Craig & Antonelli
ATTORNEYS

INVENTORS
MASAHIRO AMEMIYA, SHIUJI SAKUMA,
SUSUMU KUROKAWA, MASAYUKI EMOTO

BY Craig & Antonelli
ATTORNEYS

INVENTORS
MASAHIRO AMEMIYA, SHIUZI SAKUMA,
SUSUMU KUROKAWA, MASAYUKI EMOTO

BY Craig & Antonelli
ATTORNEYS

INVENTORS
MASAHIRO AMEMIYA, SHIUZI SAKUMA,
SUSUMU KUROKAWA, MASAYUKI EMOTO

BY Craig & Antonelli

ATTORNEYS

INVENTORS
MASAHIRO AMEMIYA, SHIUZI SAKUMA,
SUSUMU KUROKAWA, MASAYUKI EMOTO

BY Craig & Antonelli
ATTORNEYS

INVENTORS
MASAHIRO AMEMIYA, SHIUZI SAKUMA,
SUSUMU KUROKAWA, MASAYUKI EMOTO

BY Craig & Antonelli
ATTORNEYS

INVENTORS
MASAHIRO AMEMIYA, SHIUZI SAKUMA,
SUSUMU KUROKAWA, MASAYUKI EMOTO

BY Craig & Antonelli
ATTORNEYS

INVENTORS
MASAHIRO AMEMIYA, SHIUZI SAKUMA, SUSUMU KUROKAWA, MASAYUKI EMOTO

BY Craig & Antonelli
ATTORNEYS

INVENTORS
MASAHIRO AMEMIYA, SHIUZI SAKUMA,
SUSUMU KUROKAWA, MASAYUKI EMOTO

BY Craig & Antonelli
ATTORNEYS 3,523,901

MAGNETIC MATERIAL HAVING SQUARE HYSTERESIS LOOP CHARACTERISTIC AND A MEMORY CORE MADE OF THE SAME

Masahiro Amemiya, Kokubunji-shi, Shiuzi Sakuma, Tokyo, and Susumu Kurokawa and Masayuki Emoto, Kodaira-shi, Japan, assignors to Hitachi, Ltd., Tokyo, Japan, a corporation of Japan Filed Dec. 12, 1967, Ser. No. 689,966
Claims priority, application Japan, Dec. 28, 1966, 42/85,335
Int. Cl. C04b 35/40
U.S. Cl. 252—62.57 12 Claims

ABSTRACT OF THE DISCLOSURE

A magnetic material containing a lithium ferrite which contains 16.7–15.2 mol percent of $Li_2O$ and 83.3–65.8 mol percent of $Fe_2O_3$ as the main components and 0–18 mol percent of oxide or oxides of at least one metal selected from the group consisting of Mn, Mg, Ni, Zn, Cu and V as subcomponents, and 0.1–4 weight percent of oxide or oxides of at least one element selected from the group consisting of Y and lanthanide elements, and having the magnetic properties of coercive force $Hc \geqq 6.5$ oe. and squareness ratio $Br/Bm \geqq 0.85$.

Figure 1:
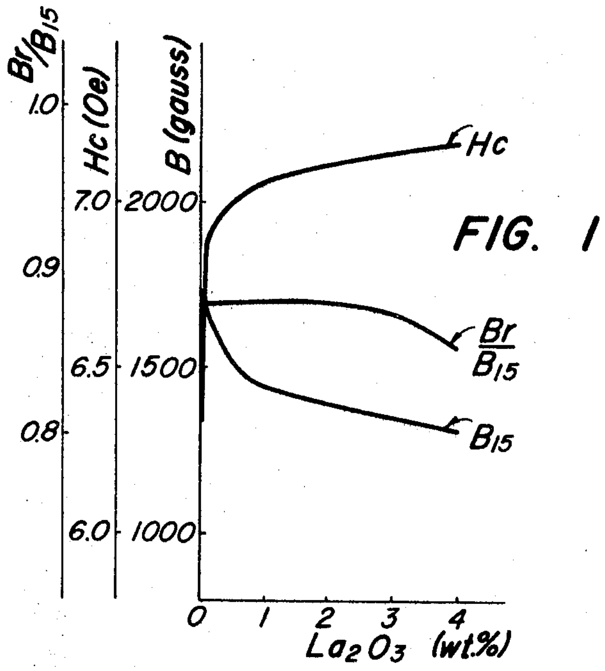
Figure 2:
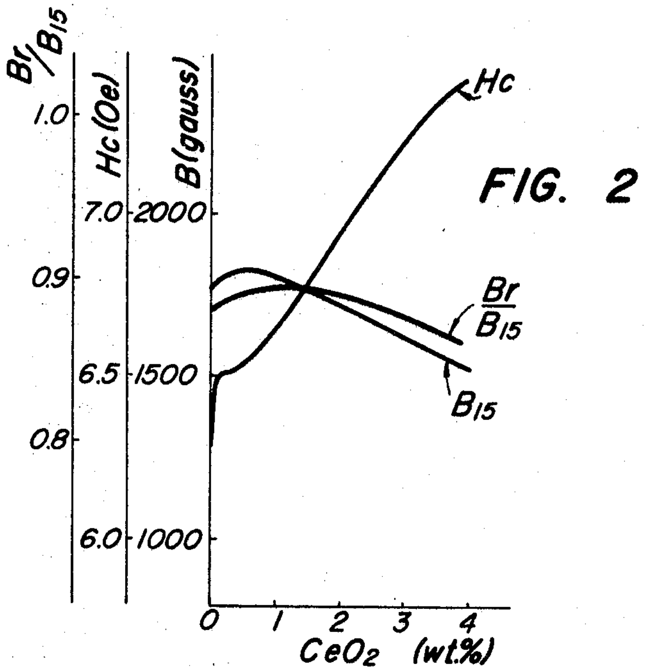
Figure 3:
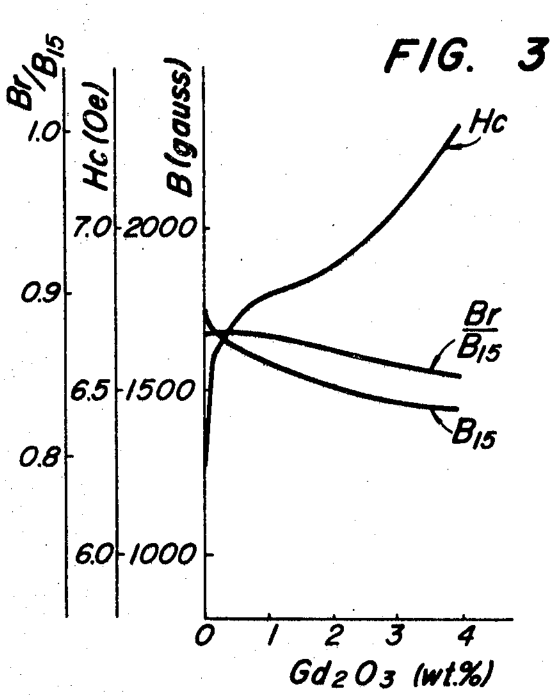
Figure 4:
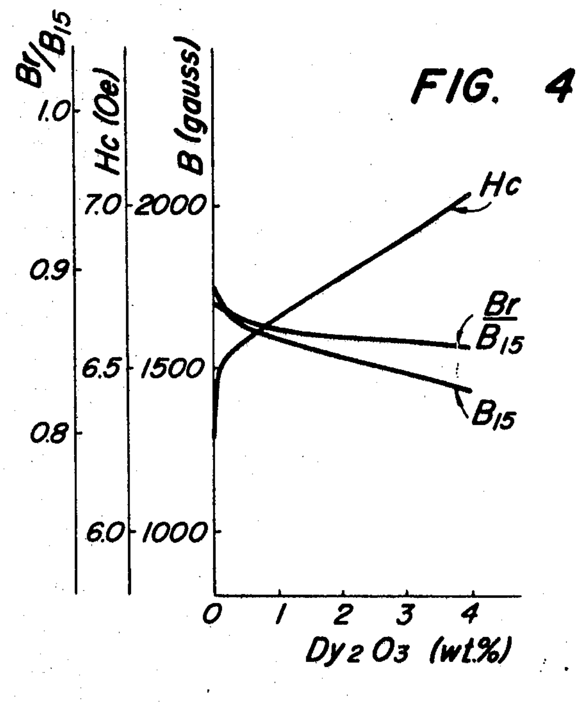
Figure 5:
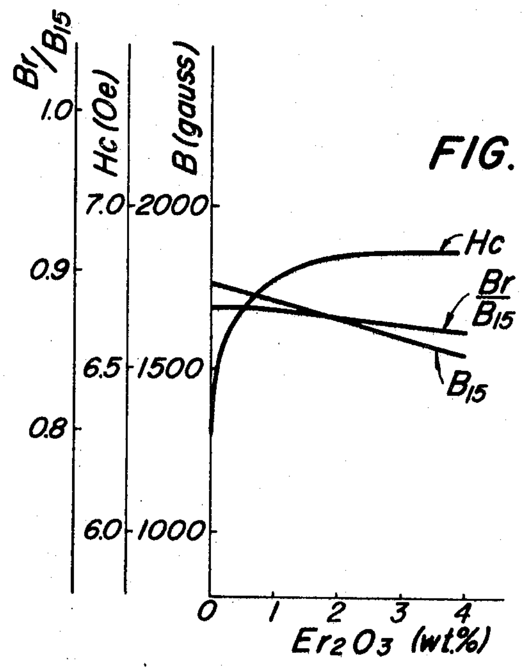
Figure 6:
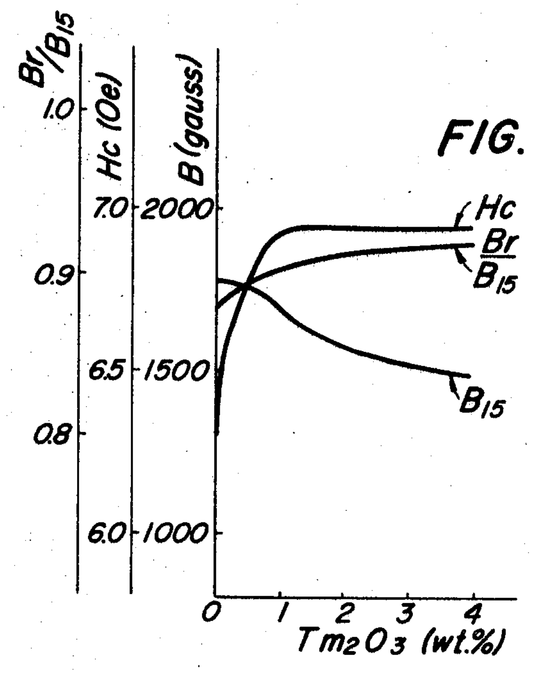
Figure 7:
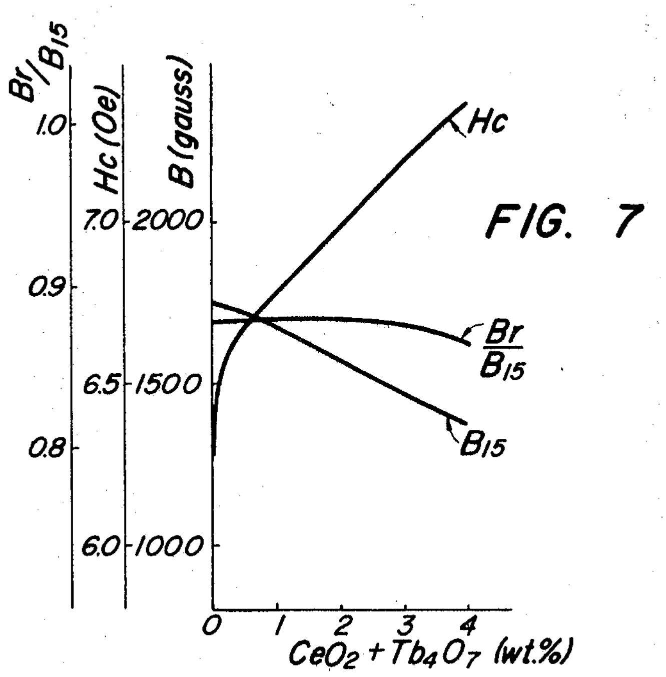

This invention relates to a magnetic material containing iron and lithium as the main components, and more particularly to an improved magnetic material exhibiting good square hysteresis characteristic.

It has been known that a magnetic material having square hysteresis loop is useful as the magnetic memory element for an electronic computer and as the magnetic core for magnetic-switch and magnetic-amplifier.

From necessity for speeding up the rates of operation of electronic computer ferrite memory cores constituting memory elements are required to provide high switching.

In order to sharply increase the switching speed of said memory core, it is necessary to miniaturize the core size and to operate the core by applying a large drive current.

In order to make the core in smaller size and to operate the core with a large drive current, the memory core must be made of such a material having not only a high coercive force Hc but also a good square hysteresis loop characteristic.

In general, however, both the requirements, increase of coercive force and improvement of square hysteresis characteristic of the hysteresis loop, are incompatible with each other. That is, when Hc is increased, the square hysteresis characteristic is sharply decreased, so that the materials are no longer used for memory core. Thus, it has been considered to be impossible to simultaneously satisfy the two requirements.

Usually, the degree of square hysteresis characteristic of a magnetic material is defined by the squareness ratio $Br/Bm$ wherein $Br$ represents residual flux density and $Bm$ represents saturation flux density. The magnetic material whose squareness ratio $Br/Bm$ is nearer 1 has better square hysteresis characteristic of hysteresis loop and is excellent as material for memory core. The value of $Br/Bm$ required as the material for a good memory core is at least 0.7 or more.

Further, when a miniaturized core memory element is operated with a great drive current, heat is generated in the core and therefore the material must have a good temperature dependency besides the above mentioned requirements. In this respect, lithium-containing ferrite has better temperature dependency as compared to that of manganese and magnesium ferrite (Mn-Mg ferrite). However, as mentioned above, it has been impossible to increase coercive force of a magnetic material while maintaining a good square hysteresis characteristic.

For example, where a core having the core size of 14 mils is used as a memory element with the drive current more than 750 ma., such a magnetic material having the coercive force Hc more than 6.5 oe. is required for constituting the core. However, no such material the property of which meet these requirements have been provided yet and so development of such materials has been considered to be an important problem to be attained.

Accordingly, one object of the present invention is to provide a magnetic material having a good square hysteresis loop characteristic required for memory core and simultaneously having a high coercive force.

It is also another object of this invention to provide a memory core particularly usable for the high rate operation electronic computer having the core size less than 14 mils and capable of being used with a drive current more than 750 ma.

The above mentioned and other objects, constructions and characteristics of this invention will be made clear from the following explanations with reference to the accompanying drawings wherein:

FIG. 1 is a graph showing changes of magnetic characteristic of a magnetic core produced by adding to a known lithium ferrite having the essential constituents of $Li_2O=16.50$, $Fe_2O_3=80.86$ and $MnO=2.64$ mol percent, respectively, with $La_2O_3$ in various weight percent per said essential constituents according to the present invention. $La_2O_3$ is used as an example of oxide of rare earth element. In FIG. 1, Hc represents coercive force, $Br/B_{15}$ represents squareness ratio, and $B_{15}$ represents flux density when magnetic field $H=15$ oe. is generated by applying current to the magnetic core made of the material under question, respectively.

From FIG. 1, it is clear that rare earth oxide greatly affects the increase of coercive force Hc.

The inventors of this invention have obtained a magnetic material having the coercive force $Hc \geqq 6.5$ oe. and squareness ratio $Br/Bm \geqq 0.85$ after carrying out full experiments by adding various amounts of rare earth compounds to a lithium ferrite.

This invention is based on said facts and the magnetic material of this invention is composed of the following compositions.

That is, the magnetic material contains a lithium ferrite containing 16.7–15.2 mol percent of $Li_2O$ and 83.3–65.8 mol percent of $Fe_2O_3$ as main components and 0–18 mol percent of an oxide or oxides of at least one metal selected from the group consisting of Mn, Mg. Ni, Zn, Cu and V and an oxide or oxides of at least one rare earth element selected from the group consisting of Y and lanthanide elements.

The lanthanide elements include 15 elements of La (atomic number 57) to Lu (71).

As is clear from said FIG. 1 and the following examples, addition of even a slight amount of said rare earth elements to said lithium ferrite gives a relative effect on improvement of magnetic characteristics, but the effect is relatively low with an added amount of less than 0.1 weight percent. Further, when the content of the rare earth element is higher than 4 weight percent, although depending upon the kind of the rare earth elements, in spite of increase of the content, some case provide almost no improvement in Hc or even when a fairly increase in Hc is appreciable, the squareness ratio and flux density in another case sometimes decrease too much so that it becomes impossible to use the material as a core. Therefore, the preferred content of the rare earth element is 0.1–4 weight percent. Within this range, a magnetic material having both $Br/Bm$ not less than 0.85 and $H_c$ not less than 6.5 can be obtained. Furthermore, since the magnetic material of this invention has a very fine grain size, it is suitably used for the production of a memory core having a core size of less than 14 mils.

The magnetic material of this invention can be easily produced by the usual method by weighing out the desired metal oxides as starting raw materials to give final constitutional amounts. As the starting materials of the magnetic material, in place of oxide, other compounds which can be easily converted to oxides by sintering, e.g., oxalates, carbonates, nitrates, etc. can be used.

Increase in only coercive force $H_c$ to more than 6.5 oe. can be attained by, for example, changing the sintering temperature without addition of rare earth oxides. However, it is impossible to maintain the squareness ratio at more than 0.85 without the rare earth oxide.

Next, the reasons why rare earth oxides advantageously affects the increase of magnetic property are explained in detail as follows. Said oxides generally have high melting points which are higher than the sintering temperature (1000°–1300° C.) of ferrite and the ionic radius of these rare earth elements is larger than those of other constituting elements of ferrite. Therefore, said rare earth elements have an action to prevent the grain growth of a sintered body in the step of sintering ferrite and hence a high coercive force may be obtained.

From the prevention of grain growth of the sintered body by rare earth element, it becomes possible to produce a sintered body having small grain size. Accordingly, the production of a small-sized core becomes possible, which is effective for increasing switching speed of memory core.

This invention will be illustrated in the following examples.

EXAMPLE 1

Lithium carbonate, ferric oxide, and maganese carbonate as starting materials were weighed out to give the concentrations of $Li_2O$ 16.50 mol percent, $Fe_2O_3$ 80.86 mol percent, and MnO 2.64 mol percent, respectively and these starting materials were then ground and mixed by a grinder for 3 hours. This mixed powder was calcined at 850° C. for one hour in air. This calcined powder was ground and mixed for 16 hours in ethylalcohol by an iron mill. This mixture was then filtrated and dried. Thereafter, rare earth oxide was mixed with the dried mixture for 2 hours by a grinder. The resultant mixture was moulded to form a small toroidal ring having the outside diameter of 15.8 mm., the inside diameter of 9.6 mm. and the thickness of 4.6 mm. This sample was particularly moulded in a large size for the purpose of examining the magnetic hysteresis (B–H) characteristic. This moulded sample was sintered at 1100° C. for 3 hours in oxygen stream and thereafter was slowly cooled at the cooling rate of 2° C./min. in oxygen stream. The magnetic properties of thus obtained sample are shown in FIGS. 1–7, which are characteristic curves of coercive force $H_c$, squareness ratio $B_r/B_{15}$ and $B_{15}$ of each sample to which different kinds of rare earth oxides were added, respectively. $B_r$ is residual flux density and $B_{15}$ is flux density at magnetic field $H=15$ oe. formed by externally applied current to the coil wound on said sample.

The relation between figures and rare earth oxides are as follows:

FIG. 1; $La_2O_3$
FIG. 2; $CeO_2$
FIG. 3; $Gd_2O_3$
FIG. 4; $Dy_2O_3$
FIG. 5; $Er_2O_3$
FIG. 6; $Tm_2O_3$
FIG. 7; $CeO_2+Tb_4O_7$ (weight ratio of $CeO_2:Tb_4O_7=1:1$).

The added amount of these rare earth oxides is shown by a weight ratio to said lithium ferrite.

As is clear from these characteristic curves, addition of up to 4.0 weight percent, particularly 0.1–4.0 weight percent of rare earth oxide resulted in remarkable increase of coercive force $H_c$ to at least 6.5 oe. while maintaining squareness ratio $B_r/B_{15}$ at at least 0.85. Among the samples to which rare earth oxides were added, there were some whose $B_r/B_{15}$ values were decreased to a lower value due to the addition than those to which no rare earth oxides were added. However, samples to which not more than 4.0 weight percent of the oxides was added maintained $B_r/B_{15}\geqq0.85$ and were satisfactorily useable as a memory core.

Addition of $Tm_2O_3$ caused the increase of $B_r/B_{15}$ as well as $H_c$, which confirms the effectiveness of the addition of rare earth oxides.

In the above example, the rare earth oxides were added after calcination, but this invention is not limited to such manner of addition. In other words, the rare earth oxides can be added to and contained in the initial starting materials to obtain the similar effects. Furthermore, as the starting materials in which rare earth oxides are contained, carbonates, oxalates and nitrates were used in place of oxides to obtain the similar effects with those obtained by using oxides.

EXAMPLE 2

Figure 8:
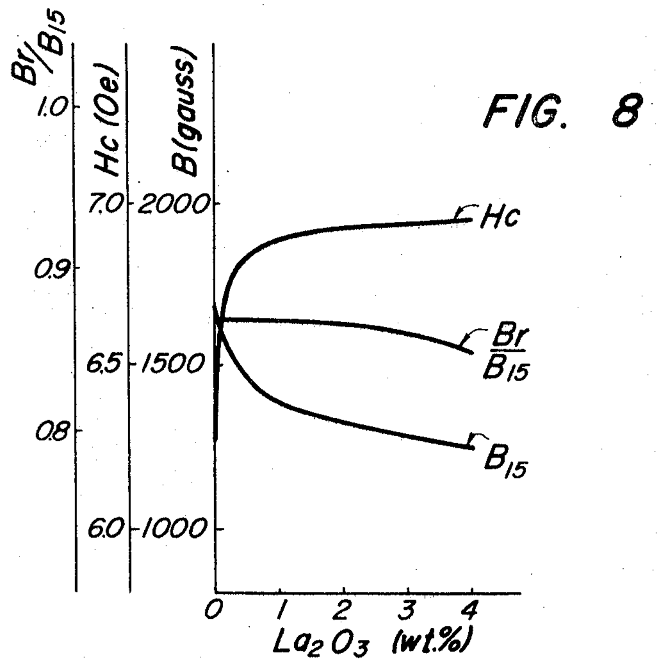

$Li_2O=15.2$ mol percent, $Fe_2O_3=65.8$ mol percent, and $MnO=18.0$ mol percent were employed as the compositions of lithium ferrite and $La_2O_3$ was added thereto as rare earth oxide. With such samples, the results shown in FIG. 8 were obtained.

The method for the production of the samples was the same as that of Example 1 except that 1120° C. was employed as the sintering temperature.

Figure 9:
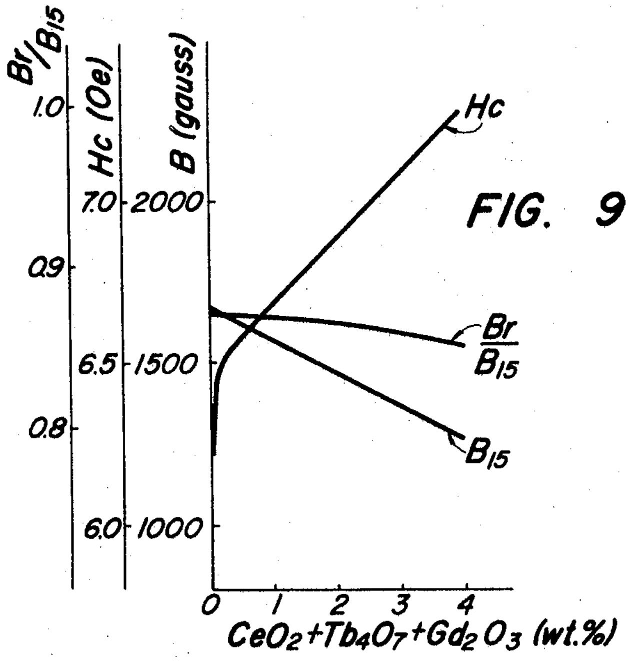

In place of said $La_2O_3$, a mixture of $CeO_2$, $Tb_4O_7$ and $Gd_2O_3$ in a weight ratio of 1:1:½ was added to the ferrite. With thus obtained samples, the results shown in FIG. 9 were obtained. It is clear that the results shown in these figures are substantially the same as those in Example 1.

EXAMPLE 3

Figure 10:
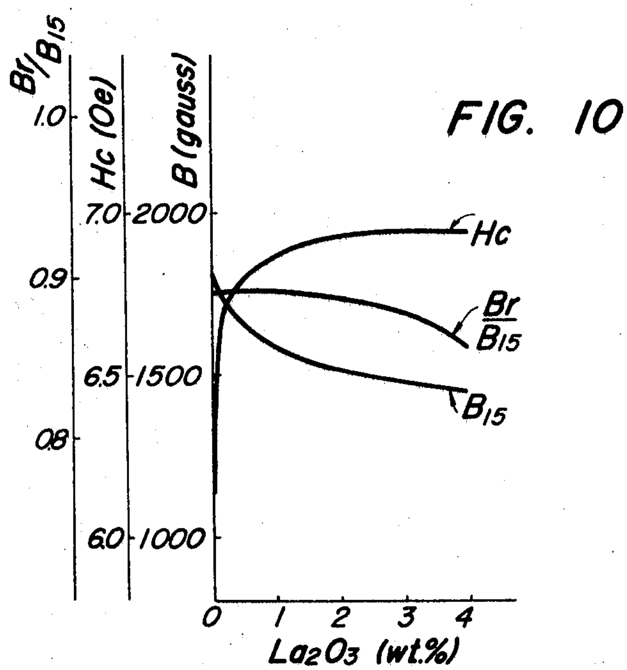
Figure 11:
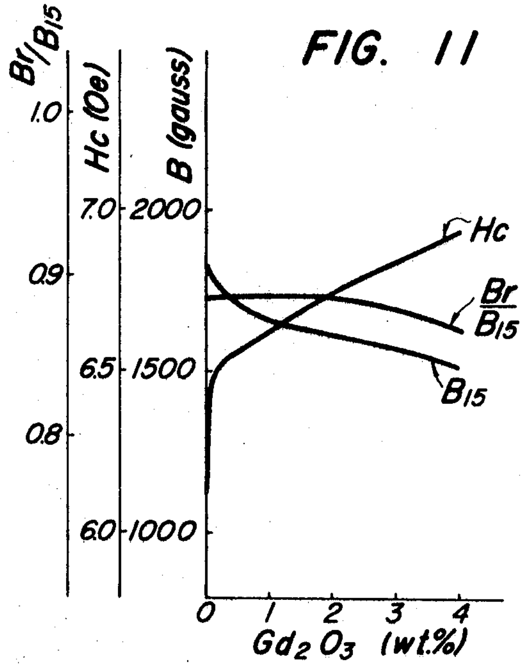

$Li_2O=16.7$ mol percent, and $Fe_2O_3=83.3$ mol percent were employed as the compositions of lithium ferrite and $La_2O_3$ and $Gd_2O_3$ were added to the ferrite as rare earth oxides. With the thus obtained samples, the results shown in FIGS. 10 and 11 were obtained.

The method for the production of the samples was the same as that in Example 1 except that 1090° C. was employed as the sintering temperature. It is clear that the thus obtained results are substantially the same as those in Example 1.

The following examples show the results of measurement of memory properties of memory cores produced from the magnetic material of this invention.

EXAMPLE 4

A memory core was produced from the magnetic material containing lithium ferrite having compositions of $Li_2O=16.50$ mol percent, $Fe_2O_3=80.86$ mol percent and $MnO=2.64$ mol percent, and 0.5 weight percent of $Er_2O_3$ and 2.0 weight percent of $Gd_2O_3$ as rare earth oxides.

The method for producing the core was substantially the same as in Example 1. Thus, lithium carbonate, ferric oxide, manganese carbonate, erbium oxide and gadolinium oxide were used as the starting materials. These materials were weighted out to give said compositions and ground and mixed for 3 hours by a grinder. The resultant mixture was calcined at 850° C. for one hour in the air and the calcined product was ground and mixed for 16 hours in ethyl alcohol by a ball mill. Thereafter, the mixture was filtered and dried, and then again ground and mixed for 2 hours by a grinder to produce fine powder. 1.5 weight percent of polyvinyl alcohol was added as a binder to said powder. To this mixture, water was added and they were well stirred and made granule by a spray dryer. The obtained granules were screened with a screen of 275–325 meshes to choose and collect the granules having said grain sizes. Then, a toroidal core (core size is 21 mils) having the outside diameter of 0.54 mm., the inside diameter of 0.32 mm. and the thickness of 0.12 mm. was molded by a pressing machine. This molded product was sintered at 1100° C. in oxygen stream and slowly cooled at the cooling rate of 2° C./min. in oxygen stream to produce a memory core.

Regarding the measurements of the memory properties, signal output voltage $dV_1$, noise output voltage $dV_0$, switching time $Ts$ of $dV_1$ and peaking time $Tp$ of $dV_1$ were measured by pulse programming generator. The switching time $Ts$ of $dV_1$ means the time from the generation of signal output voltage $dV_1$ to vanishing thereof, and the peaking time $Tp$ means the time required until the signal output voltage $dV_1$ becomes maximum from its generation. There are generally called switching speed or switching characteristics. As a memory core, the greater the quotient $dV_1/dV_0$ is and the shorter the $Ts$ and $Tp$ are, the better the characteristics are.

The measuring conditions are as follows:

| | |
|---|---|
| Rise time of pulse ________nsec__ | 50 |
| Falling time of pulse ________nsec__ | 50 |
| Pulse width ________nsec__ | 300 |
| Disturb ratio ________ | 0.62 |
| Number of disturb pulse ________ | 64 |

Figure 12:
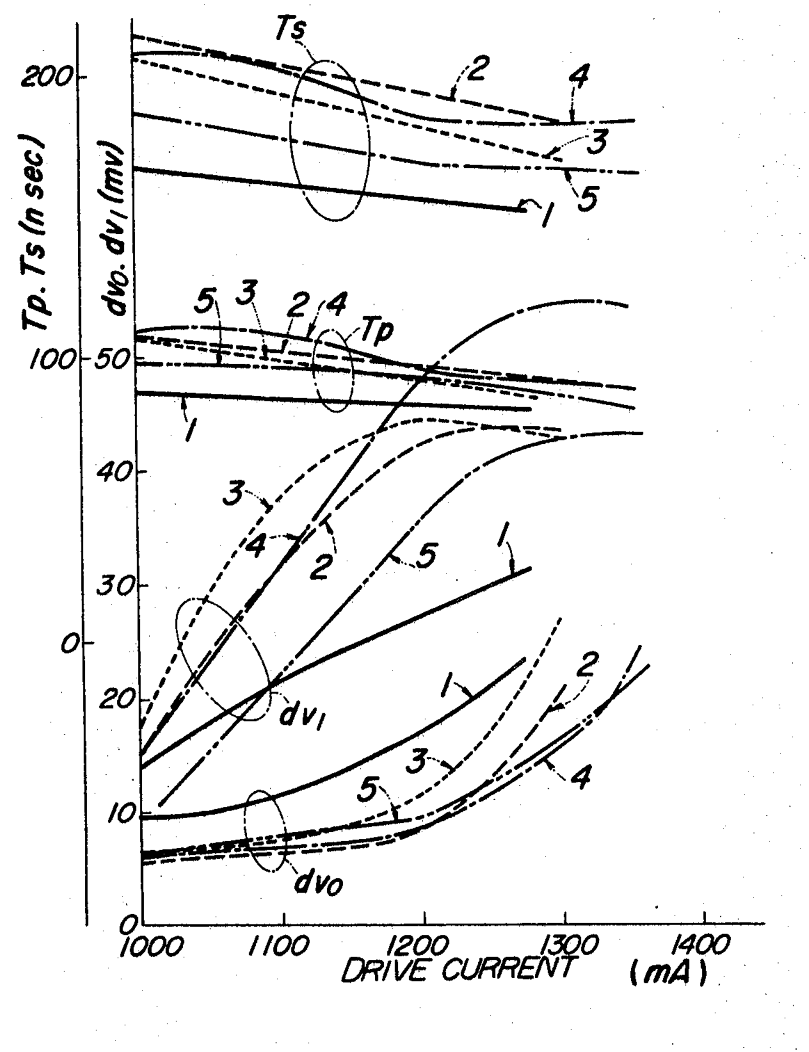

The memory characteristics of said samples are shown in FIG. 12. The numbers of curves in FIG. 12 correspond to those of the samples and the relations between them are as follows:

Curve 1 (sample 1); no rare earth oxide is added.
Curve 2 (sample 2); 0.5 weight percent of $Er_2O_3$ is added.
Curve 3 (sample 3); 2.0 weight percent of $Er_2O_3$ is added.
Curve 4 (sample 4); 0.5 weight percent of $Gd_2O_3$ is added.
Curve 5 (sample 5); 2.0 weight percent of $Gd_2O_3$ is added.

As is clear from said figure, in sample 1 (curve 1) to which no rare earth oxide is added, $dV_1$ is close to $dV_0$ and the difference therebetween is small as compared with other curves. This fact shows that the square hysteresis characteristic is poor and such sample cannot be used as memory core. Although the switching speed thereof is higher than that of the samples containing rare earth oxide, this is due to the poorness of the square hysteresis characteristic as mentioned above and it cannot be said that the switching speed of the sample having no rare earth oxide is essentially higher than that of the samples containing rare earth oxide. That is, the samples of curves 2–5 have sufficient characteristics as a memory core and the memory characteristics are remarkably improved by the addition of rare earth oxide.

As an example, the $dV_1$, $dV_0$ and $dV_1/dV_0$ of said samples at drive currents of 1100 ma. and 1200 ma. are shown in Table 1 for reference.

As explained above, a sample which has the greater value of $dV_1/dV_0$ has the more excellent memory characteristics. As is clear from this table, sample 1 which is conventional one has 1.87 and 1.59 at 1100 ma. and 1200 ma., respectively, while the sample of this invention has 2.75–5.59. This fact shows that the sample of this invention is notably excellent. That is, the memory core of this invention has low noise output voltage $dV_0$ and remarkably high signal output voltage $dV_1$.

TABLE 1

| Sample | Drive current 1,100 ma. | | | Drive current 1,200 ma. | | |
|---|---|---|---|---|---|---|
| | $dV_0$(mv.) | $dV_1$(mv.) | $dV_1/dV_0$ | $dV_0$(mv.) | $dV_1$(mv.) | $dV_1/dV_0$ |
| 1 | 11.5 | 21.5 | 1.87 | 17.0 | 27.0 | 1.59 |
| 2 | 6.5 | 31.5 | 4.85 | 8.5 | 42.0 | 4.94 |
| 3 | 7.5 | 37.5 | 5.00 | 11.0 | 43.5 | 3.95 |
| 4 | 7.0 | 31.5 | 4.50 | 8.5 | 47.5 | 5.59 |
| 5 | 8.0 | 22.0 | 2.75 | 9.5 | 35.5 | 3.74 |

EXAMPLE 5

A lithium ferrite having the compositions of $Li_2O$=16.44 mol percent, $Fe_2O_3$=80.57 mol percent, MnO=2.63 mol percent and $V_2O_5$=0.36 mol percent was prepared and 0.5 weight percent of $Gd_2O_3$ and $Er_2O_3$, respectively were added thereto.

Figure 13:
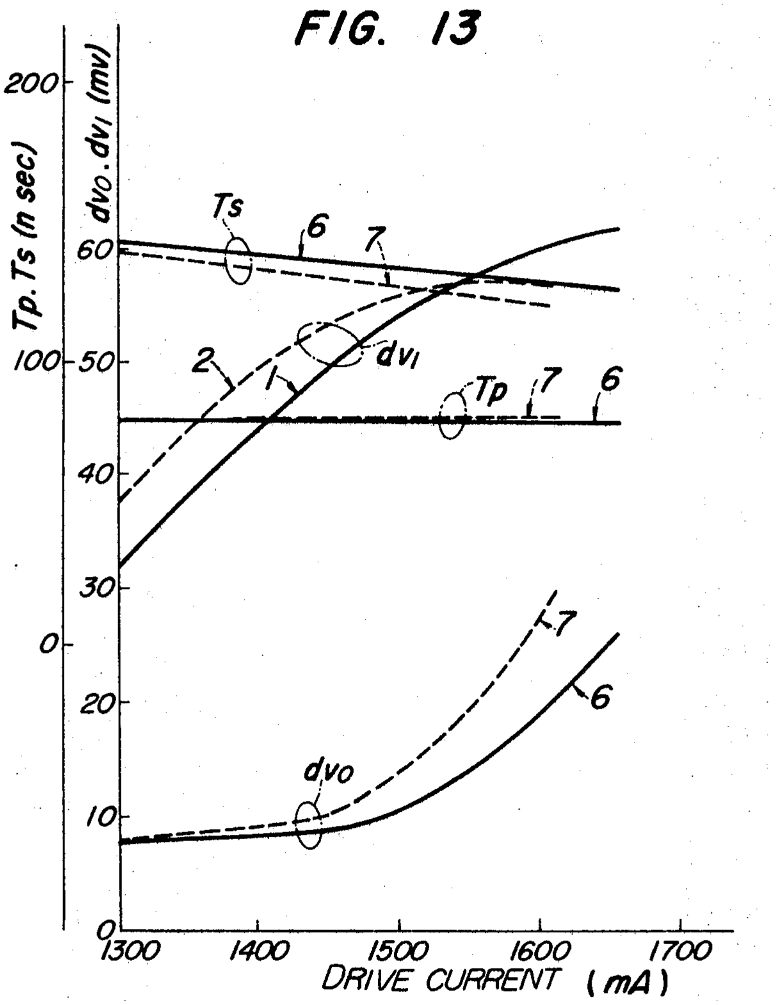

The method for the production of the samples was the same as in Example 4 and 21 mils memory cores were produced as samples for measurement. The memory characteristics of the samples are shown in FIG. 13, in which curve 6 shows the memory characteristics of sample 6 which contains $Gd_2O_3$ and curve 7 shows that of sample 7 which contains $Er_2O_3$.

As is clear from this figure, said samples have high $dV_1$ and low $dV_0$, the difference between which is about 40 mv. ($dV_1/dV_0 \doteqdot 5.1$–$5.3$) at a drive current of 1400–1500 ma. Thus, these samples can be used at a high current and have the excellent characteristics as a memory core for high rate operation.

Samples which has the same compositions as said samples 6 and 7, but contains no rare earth oxide do not exhibit memory characteristics at all.

All of the above memory cores have the core size of 21 mils, but this size is merely one example of this invention. By the material of this invention, it is possible to produce a small size core of less than 14 mils, since the grain size of the sintered powders is very small. The example of such a small size core is shown in the following example.

EXAMPLE 6

Figure 14:
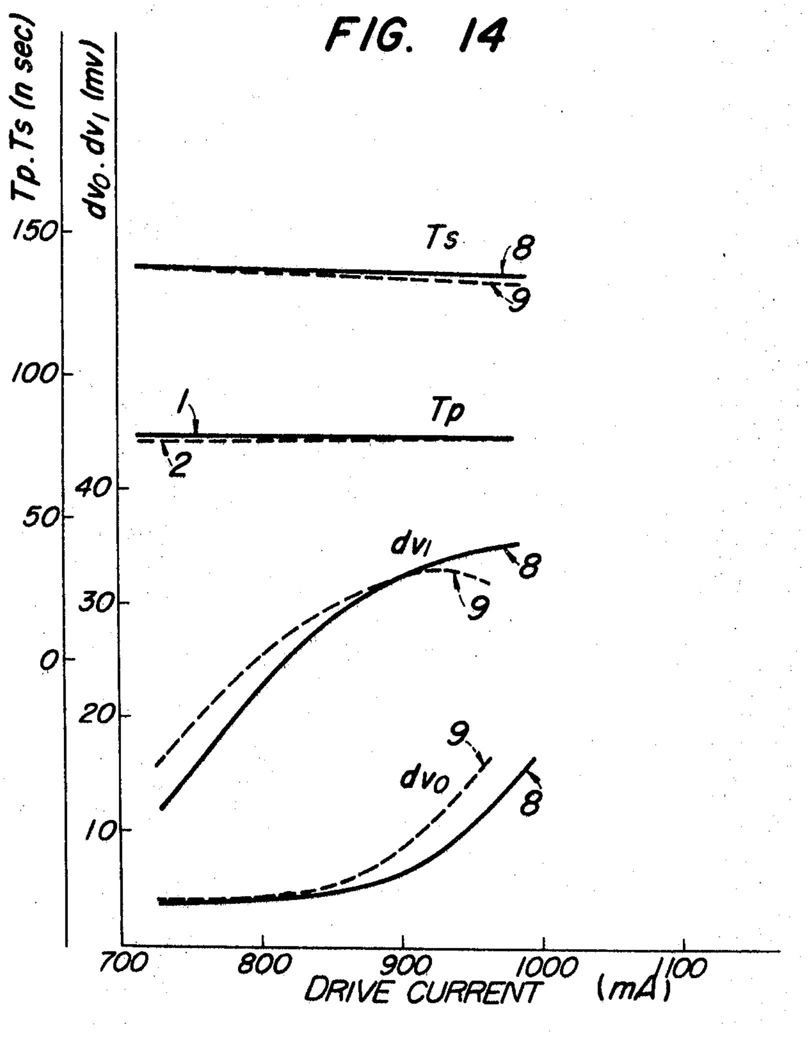

A memory core having the core size of 12 mils was produced by the same method as in Example 5 using a magnetic material having the same compositions as of Example 5. The memory characteristics of the samples are shown in FIG. 14. Curves 8 and 9 represent the characteristics of samples containing 0.5 weight percent of $Gd_2O_3$ and $Er_2O_3$, respectively.

As is clear from said characteristic curves, the characteristics are substantially the same as in Example 5 and such samples can be used as a memory core.

It is clear from said examples that the ferrite containing rare earth oxide exhibits a notable effect particularly as a memory core and can be considered to be an excellent magnetic material. Furthermore, other rare earth oxides which were not employed in said examples also exhibited substantially the same effects as in said examples.

That is, as is shown in examples, the magnetic material of this invention has the magnetic properties of coercive force $Hc \geqq 6.5$ oe., and squareness ratio $Br/Bm \geqq 0.85$. By using the material having such properties, a memory core having a core size of less than 14 mils can be produced. In addition, this core can be used at a drive current higher than 750 ma. Therefore, the industrial value of the material of this invention is remarkably high in view of a large capacity of the electronic computer and increase of rate of operation.

What we claim is:

1. A magnetic material consisting essentially of a lithium ferrite which contains 16.7–15.2 mol percent of $Li_2O$ and 83.3–65.8 mol percent of $Fe_2O_3$ as main components thereof and not more than 18 mol percent of oxide or oxides of at least one metal selected from the group consisting of Mn, Mg, Ni, Zn, Cu and V as subcomponents, and oxide or oxides of at least one rare earth element selected from the group consisting of Y and lanthanide elements, the content of said rare earth oxide being 0.1–4 weight percent, said material being characterized by its high coercive force and good high squareness ratio properties.

2. A magnetic material according to claim 1, wherein the rare earth oxides include at least $La_2O_3$, $CeO_2$, $Gd_2O_3$, $Dy_2O_3$, $Er_2O_3$, $Tm_2O_3$ and $Tb_4O_7$.

3. A magnetic material according to claim 1, wherein the content of $Li_2O$ is 16.50 mol percent, the content of $Fe_2O_3$ is 80.86 mol percent, the content of MnO is 2.64 mol percent and which is added with 0.1–4.0 weight percent of at least one of $La_2O_3$, $CeO_2$, $Gd_2O_3$, $Dy_2O_3$, $Er_2O_3$, and $Tm_2O_3$.

4. A magnetic material consisting essentially of 15.2 mol percent of $Li_2O$, 65.8 mol percent of $Fe_2O_3$, 18.0 mol percent MnO and 0.1–4.0 weight percent of $La_2O_3$ and/or a mixture of $CeO_2$, $Tb_4O_7$ and $Gd_2O_3$.

5. A magnetic material comprising 16.7 mol percent of $Li_2O$, 83.3 mol percent of $Fe_2O_3$, and 0.1–4.0 weight percent of at least one of $La_2O_3$ and $Gd_2O_3$.

6. A ferrite memory core formed of the magnetic material defined in claim 1, which is characterized by having its coercive force, H*c*, not less than 6.5 oersteds and squareness ratio, *Br/Bm*, not less than 0.85.

7. A ferrite memory core formed of the magnetic material as defined in claim 2.

8. A ferrite memory core formed from the magnetic material as defined in claim 3.

9. A ferrite memory core formed of the magnetic material consisting esesntially of 16.50 mol percent of $Li_2O$, 80.86 mol percent of $Fe_2O_3$, 2.64 mol percent of MnO and 0.5–2.0 weight percent of $Er_2O_3$.

10. A ferrite memory core formed of the magnetic material consisting essentially of 16.50 mol percent of $Li_2O$, 80.86 mol percent of $Fe_2O_3$, 2.64 mol percent of MnO, 0.5–2.0 weight percent of $Gd_2O_3$.

11. A ferrite memory core formed of the magnetic material consisting essentially of 16.44 mol percent of $Li_2O$, 80.57 mol percent of $Fe_2O_3$, 2.63 mol percent of MnO, 0.36 mol percent of $V_2O_5$, and 0.5 weight percent of $Gd_2O_3$.

12. A ferrite memory core formed of the magnetic material consisting essentially of 16.44 mol percent of $Li_2O$, 80.57 mol percent of $Fe_2O_3$, 2.63 mol percent of MnO, 0.36 mol percent of $V_2O_5$ and 0.5 weight percent of $Er_2O_3$.

References Cited

UNITED STATES PATENTS

| | | | |
|---|---|---|---|
| 3,066,102 | 11/1962 | Eckert | 252—62.57 |
| 3,193,502 | 7/1965 | Shieber | 252—62.57 |
| 3,370,011 | 2/1968 | Kitagawa et al. | 252—62.61 |
| 3,372,122 | 3/1968 | Lessoff | 252—62.61 |
| 3,372,123 | 3/1968 | Esveldt et al. | 252—62.61 |
| 3,376,227 | 4/1968 | Van Driel et al. | 252—62.61 |

TOBIAS E. LEVOW, Primary Examiner

R. D. EDMONDS, Assistant Examiner

U.S. Cl. X.R.

252—62.6, 62.61, 62.62, 62.64